Sept. 4, 1928.  1,682,889
F. G. CREED
CLUTCH MECHANISM, SPECIALLY SUITABLE FOR USE IN TELEGRAPHIC APPARATUS
Filed Aug. 12, 1926
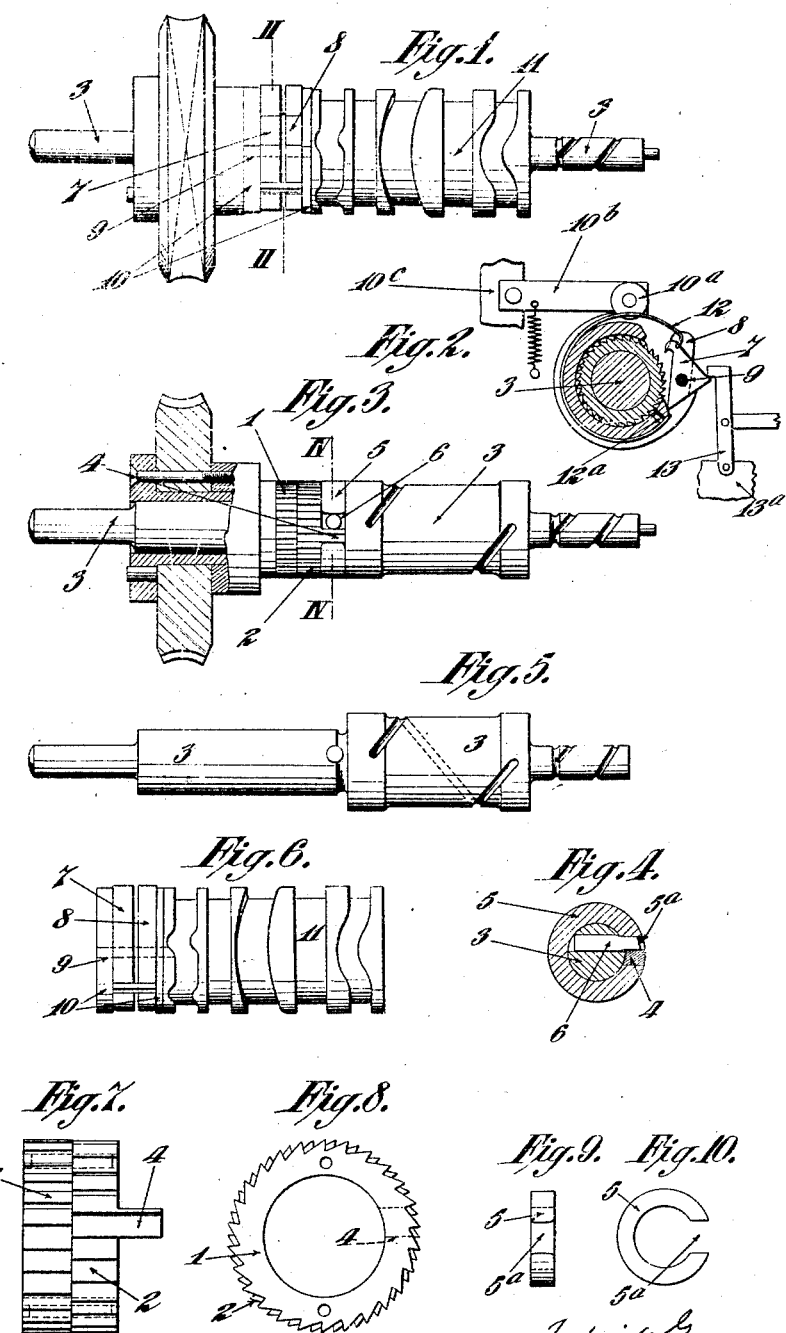

Patented Sept. 4, 1928.

1,682,889

UNITED STATES PATENT OFFICE.

FREDERICK GEORGE CREED, OF CROYDON, ENGLAND, ASSIGNOR TO HIMSELF AND CREED & COMPANY LIMITED, BOTH OF CROYDON, ENGLAND.

CLUTCH MECHANISM, SPECIALLY SUITABLE FOR USE IN TELEGRAPHIC APPARATUS.

Application filed August 12, 1926, Serial No. 128,865, and in Great Britain October 21, 1925.

This invention has reference to clutch mechanism of the type comprising a toothed wheel associated with a rotary member and a pivoted pawl adapted to co-act with the toothed wheel and associated with another rotary member, for the purpose of transmitting rotary motion from one rotary member to the other. The teeth of the wheel are usually made of ratchet shape with pointed ends and the engaging part of the pawl is also of pointed shape. With such a construction it may happen that the point of the pawl will, when moved towards the toothed wheel for engagement therewith, engage the extreme point of one of the teeth thereof, due for instance to the points, or one of them, having become slightly blunt, with the result that effective engagement of the pawl with the toothed wheel will not take place at all, or not at the right moment, and thus cause defective working of the apparatus in which the clutch mechanism is used.

The abutting of the pawl with a tooth of the wheel as described, also has the disadvantage of causing frequent breakage of the pawl and of a tooth of the ratchet wheel, due to the whole load being taken by the extreme tip of the tooth instead of by the whole surface of the tooth, because, even though the tooth may be strong enough to do the work required, if the pawl gets a full engagement with it, a partial engagement reduces the contact area, and thereby increases the pressure per square inch. In some classes of apparatus with which such a clutch is intended to be used, it is important that a large number of teeth be used in the ratchet wheel because, if the pawl misses one tooth when engaging with the ratchet wheel, the rotary member associated with the pawl is caused to assume a different orientation, and therefore the timing of the mechanism operated by the rotary member, is altered. If only a few teeth are used in the ratchet wheel, this orientation, due to the missing of one tooth, is obviously more serious. Also, if the pawl engages the extreme tip of one of the ratchet teeth, it may, in springing off this tooth, be thrown back so far as to miss not only the next but perhaps other successive teeth before effective engagement is made.

When the ratchet wheel is coupled solidly with its driving member, as heretofore usual, the shock of starting the rotary member associated with the pawl is very considerable and the pawl has to be made very strong to withstand this shock. It must also be tempered to a fairly low spring temper otherwise it would break. This has the disadvantage of causing undue wear on the extreme tip of the pawl, owing to the fact that it cannot be made very hard.

The present invention has for its object to avoid the foregoing disadvantages.

For this purpose, clutch mechanism of the type refered to, constructed according to the present invention, comprises a number of similar toothed wheels, usually two, arranged side by side, having their respective sets of teeth staggered in relation to one another and mounted freely on a shaft from which they are adapted to be driven simultaneously through a shock absorber, and a corresponding number of independently pivoted pawls, usually two, similar to one another and pivoted freely on a second rotary member so that when the pointed ends of the pawls are moved towards the toothed wheels for engagement therewith, one or other of them will engage one or other of the toothed wheels, and thus ensure, with greater certainty than heretofore, that the rotary member carrying the pawls shall be coupled to the toothed wheels and motion communicated from one to the other of the rotary parts carrying the toothed wheels and pawls.

This construction also has the advantage of enabling fewer teeth to be used in each wheel, so that the teeth can be made stronger, while still keeping the effective pitch of the combined wheels the same. Also, with the use of two or more ratchet wheels, even though one pawl engages the tip of its associated ratchet wheel and gets thrown out, the second pawl, being half way between two teeth on its associated wheel, is bound to get full engagement therewith, therefore the variation in orientation of the rotary member is reduced to a minimum. To avoid the shock of starting the rotary member associated with the pawls, a shock absorber is associated with the ratchet wheels so that although the work done is the same, the shock of starting the rotary driven member is very considerably reduced and therefore the pawls may be made correspondingly harder and the wear on the tip of the teeth reduced to a minimum, thereby giving the pawls a very much longer life. The pawls may also be narrower than before.

Clutch mechanism according to the invention can be variously constructed.

In the accompanying illustrative drawings, Fig. 1 shows in side elevation, one construction of clutch mechanism embodying the present invention. Fig. 2 is a cross section on the line II—II of Fig. 1, showing also a detent device for normally holding the pawls out of engagement with their associated ratchet wheels. Fig. 3 shows partly in side elevation and partly in section the driving spindle with ratchet wheels and a shock absorber. Fig. 4 is a cross section on the line IV—IV of Fig. 3. Figs. 5 and 6 are separate side elevations of the driving and driven members respectively of the clutch. Figs. 7 and 8 show respectively in side and end elevation, and to a larger scale than Fig. 1, the two ratchet wheels detached from the driving member. Figs. 9 and 10 show respectively in side and end elevation a spring ring detached from the driving member.

In the example shown, the clutch mechanism comprises two ratchet wheels 1 and 2 connected together sideways, as by pins with their sets of ratchet shaped teeth staggered in relation to one another (Fig. 7 and 8) to the extent of about half the pitch of the teeth. The wheels are mounted upon but not fixed to a driving spindle 3 which spindle is adapted to be driven, as for instance by worm gear, one member of which, a worm wheel, is shown. One of the ratchet wheels, namely 2, is provided at one side with a pin 4 that extends horizontally into a gap 5$^a$ in a spring ring or collar 5 (Figs. 9 and 10) that closely encircles the spindle (Fig. 3). Extending through the gap 5$^a$ is a pin 6 that is fixed to the spindle 3, and is located between the pin 4 and one side of the said gap. The arrangement is such that the ratchet wheels 1 and 2 are driven from the spindle through the pin 6 which bears against one side of the gap 5$^a$ in the spring ring 5, the other end of the gap bearing against the pin 4 on the ratchet wheel 2. Arranged to coact with the ratchet wheels 1 and 2 are two pawls 7 and 8 (Figs. 1 and 2) separately mounted on a pin 9 in a carrier 10 connected to or forming part of a rotary member 11, for instance a cam sleeve, mounted freely on the spindle 3, and designed to be driven from the driving spindle 3. The pawls 7 and 8 are each controlled by a separate curved blade spring 12 which is fixed at one end, as by a stud 12$^a$ that is fixed to the carrier 10 and riveted on to the spring, the other free end of the spring acting against the corresponding pawl. The two pawls, the points of which are V-shaped, are normally held away from the ratchet wheels 1 and 2, against the action of their springs 12, by controlling means, such as a trip device 13 pivoted on a stationary support 13$^a$, and which, when operated to trip or release the pawls, will permit the latter to be moved by their spring devices 12 towards the wheels 1 and 2 with one or other of which one or other of the pawls will be engaged so that they and their carrier 10 and attached rotary member 11 will be driven from the spindle 3 through one or other of the ratchet wheels.

A cam retaining device comprising a roller 10$^a$ carried by a spring controlled lever arm 10$^b$ pivoted to a fixed part 10$^c$ of the apparatus, serves by entering a concave recess in the periphery of the carrier 10 at the end of each rotation thereof, to prevent the sleeve 11 being turned backward by and through the action of the springs 12 when the free outer ends of the springs are moved outward by the pawls when they are moved away from the toothed wheels 1 and 2 by reason of the detent 13 engaging them.

The arrangement is such that normally the pawls 12 are held away from the ratchet wheels 1 and 2 by the detent 13, as shown in Fig. 2, at which time the sleeve 11 is held stationary being then out of engagement with the driving shaft 3. When the detent is moved out of engagement with the pawls, these are moved by their springs 12 towards the ratchet wheels 1 and 2 with one or other of which the corresponding pawl will engage so that the sleeve will be rotated from the driving shaft 3 through the pin 6, the spring ring 5, the pin 4 and one or other of the ratchet wheels 1 and 2, the spring ring 5, owing to its resiliency, acting to absorb shock, owing to the inertia of the sleeve, when the sleeve is suddenly connected to the driving shaft through the parts mentioned. Clutch mechanism according to the invention can advantageously be used in telegraphic apparatus of the kind described in the specifications of former Letters Patent Nos. 1,543,906, 1,579,087 and 1,639,212 granted to me, in lieu of the ratchet clutch mechanism previously used in such apparatus.

What I claim is:—

1. Clutch mechanism comprising a rotary driving member, a rotary driven member, a number of toothed wheels adapted to be rotated by said driving member and having their respective sets of teeth staggered in relation to one another, spring actuated pawls equal in number to the toothed wheels and pivoted to said driven member and adapted, when released, to move towards and engage one or other of said toothed wheels and means whereby said pawls can be moved out of engagement with said wheels.

2. Clutch mechanism of the kind herein referred to, comprising a rotary driving member, a number of toothed wheels adapted to be rotated by said driving member and having their respective sets of teeth staggered in relation to one another, a rotary driven member, a number of spring actuated pawls equal in number to said toothed wheels carried by said driven member, said pawls being mounted to turn independently of each other about a common axis and when released, to move toward said toothed wheels, and means adapted alternatively to move said pawls out of engagement with said toothed wheels and to release them.

3. Clutch mechanism of the kind herein referred to, comprising a rotary driving member, a number of toothed wheels having their respective sets of teeth staggered in relation to one another, a shock absorber arranged between said driving member and said toothed wheels, a rotary driven member, a number of spring actuated pawls equal in number to said toothed wheels and carried by said driven member, said pawls being mounted to turn independently of each other about a common axis and when released, to move toward said toothed wheels, and means adapted alternately to move said pawls out of engagement with said toothed wheels and to release them.

4. Clutch mechanism of the kind herein referred to, comprising a driving shaft, a number of toothed wheels connected together and mounted on, but not fixed to said driving shaft and having their respective sets of teeth staggered in relation to one another, a shock absorber arranged between said shaft and toothed wheels and adapted to rotate the latter, a rotary driven member co-axial with said driving shaft, a number of spring controlled pawls, carried by said driven member and adapted to turn independently of each other about a common axis and when released, to move towards said toothed wheels and means adapted alternately to hold and release said pawls.

5. Clutch mechanism of the kind herein referred to, comprising a rotary driving member, a number of toothed wheels adapted to be rotated by said driving member and having their respective sets of teeth staggered in relation to one another, a rotary cam device co-axial with said driving member, a number of spring actuated pawls carried by said rotary cam device and adapted to turn independently of each other about a common axis and when released to move towards said toothed wheels and means adapted alternately to hold and release said pawls.

6. Clutch mechanism of the kind herein referred to, comprising a rotary driving member, a number of toothed wheels, a shock absorber arranged between said driving member and toothed wheels and adapted to drive the latter, said toothed wheels having their respective sets of teeth staggered in relation to one another, a rotary cam device co-axial with said driving member, a number of spring actuated pawls carried by said rotary cam device and adapted to turn independently of each other about a common axis and when released to move towards said toothed wheels and means adapted alternately to hold and release said pawls.

7. Clutch mechanism of the kind herein referred to, comprising a rotary driving member, a number of toothed wheels connected together and having their respective sets of teeth staggered in relation to one another, one of said wheels having a lateral projection, a shock absorber consisting of a spring ring encircling a portion of said driving member, and having a gap in its periphery into which the lateral projection on one of said toothed wheels extends and a pin fixed to said rotary member and located between the said lateral projection and one side of said gap, a rotary driven member co-axial with the driving member, a number of spring actuated pawls carried by said rotary driven member and adapted to turn independently of each other about a common axis and when released to move towards said toothed wheels and means adapted alternately to hold and release said pawls.

8. Clutch mechanism of the kind herein referred to, comprising a rotary driving member, a number of toothed wheels connected together and having their respective sets of teeth staggered in relation to one another, one of said wheels having a lateral projection, a shock absorber consisting of a spring ring encircling a portion of said driving member, and having a gap in its periphery into which the lateral projection on one of said toothed wheels extends and and a pin fixed to said rotary member and located between said lateral projection and one side of said gap, a rotary cam device co-axial with said driving member, a number of spring actuated pawls carried by said rotary cam device and adapted to turn independently of each other about a common axis and when released to move towards said toothed wheels and means adapted alternately to hold and release said pawls.

9. Clutch mechanism of the kind herein referred to, comprising a rotary driving shaft, a number of toothed wheels mounted thereon and driven therefrom and having their respective sets of teeth staggered in relation to one another, a rotary driven member mounted on but not connected to said shaft, a number of spring actuated pawls carried by said driven member and mounted to turn independently of each other about a common axis and when released to move towards and engage one or other of said toothed wheels and means adapted alternately to move said pawls out of engagement with said wheels and to release them.

10. Clutch mechanism of the kind herein referred to, comprising a rotary driving shaft, a number of toothed wheels mounted thereon and driven therefrom and having their respective sets of teeth staggered in relation to one another, a rotary cam device mounted on said shaft but not connected thereto, a number of spring actuated pawls carried by said cam device and mounted to turn independently of each other about a common axis and when released to move towards and engage one or other of said toothed wheels and means adapted alternately to move said pawls out of engagement with said wheels and to release them.

11. Clutch mechanism of the kind herein referred to, comprising a rotary driving shaft, a number of toothed wheels mounted thereon and having their respective sets of teeth staggered in relation to one another, a shock absorber between said shaft and toothed wheels, a rotary cam device mounted on but not connected to said shaft, a number of spring actuated pawls carried by said cam device and mounted to turn independently of each other about a common axis and when released to move towards and engage one or other of said toothed wheels and means adapted alternately to move said pawls out of engagement with said wheels and to release them.

12. Clutch mechanism of the kind herein referred to, comprising a rotary driving shaft, a number of toothed wheels mounted thereon and having their respective sets of teeth staggered in relation to one another, one of said wheels having a lateral projection, a spring collar closely surrounding said shaft and having a gap in its periphery into which said projection extends, a pin fixed to said shaft and extending between said lateral projection and one side of said gap, a rotary cam device mounted on but not connected to said shaft, a number of spring actuated pawls carried by said cam device and mounted to turn independently of one another about a common axis and adapted when released to move towards and engage one or other of said toothed wheels, and means adapted alternately to move said pawls out of engagement with said wheels and to release them.

Signed at Croydon in the county of Surrey, England, this twenty-sixth day of July, 1926.

FREDERICK GEORGE CREED.